US010102760B1

(12) United States Patent
Foltan et al.

(10) Patent No.: US 10,102,760 B1
(45) Date of Patent: Oct. 16, 2018

(54) MANEUVER PREDICTION BASED ON AUDIO DATA

(71) Applicant: Honeywell International Inc., Morris Plains, NJ (US)

(72) Inventors: Stanislav Foltan, Prievidza (CZ); Robert Sosovicka, Brno (CZ); Eva Josth Adamova, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/684,435

(22) Filed: Aug. 23, 2017

(51) Int. Cl.
*G08G 5/04* (2006.01)
*G10L 25/51* (2013.01)
*H04R 29/00* (2006.01)
*G10L 15/02* (2006.01)

(52) U.S. Cl.
CPC .............. *G08G 5/045* (2013.01); *G10L 15/02* (2013.01); *G10L 25/51* (2013.01); *H04R 29/00* (2013.01); *H04R 2499/13* (2013.01)

(58) Field of Classification Search
CPC .... G08G 5/0013; G08G 5/045; G08G 5/0047; G08G 5/0078; G10L 15/02; G10L 15/26; G10L 25/51
USPC ..... 340/945, 961, 963, 984; 701/36, 45, 301
See application file for complete search history.

(56) References Cited

U.S. PATENT DOCUMENTS

| 7,737,867 | B2 | 6/2010 | Arthur et al. |
| 7,809,405 | B1 | 10/2010 | Rand et al. |
| 7,912,592 | B2 | 3/2011 | Komer et al. |
| 8,704,701 | B2 | 4/2014 | Pschierer et al. |
| 9,230,549 | B1 | 1/2016 | Popik et al. |
| 9,262,927 | B2 | 2/2016 | Populus et al. |
| 9,443,433 | B1 | 9/2016 | Conway et al. |
| 9,466,290 | B2 | 10/2016 | Joyce |
| 9,620,119 | B2 | 4/2017 | Bilek et al. |
| 9,847,034 | B1* | 12/2017 | Plawecki .............. G08G 5/0069 |
| 2012/0010887 | A1* | 1/2012 | Boregowda ........... G10L 15/063 704/250 |
| 2016/0063999 | A1 | 3/2016 | Gaston et al. |
| 2016/0093302 | A1* | 3/2016 | Bilek ...................... G10L 15/26 704/235 |
| 2016/0284220 | A1* | 9/2016 | Kar ....................... G08G 5/0008 |
| 2017/0110018 | A1 | 4/2017 | Wang et al. |

FOREIGN PATENT DOCUMENTS

WO 2016070349 A1 5/2016

OTHER PUBLICATIONS

Cordero, et al., "Automated Speech Recognition in ATC Environment," Semantic Scholar, ATACCS 2012, May 29-31, 2012, pp. 46-53.

(Continued)

*Primary Examiner* — Hung T Nguyen
(74) *Attorney, Agent, or Firm* — Shumaker & Sieffert, P.A.

(57) ABSTRACT

This disclosure is directed to a system includes a receiver configured to receive audio data from a vehicle. In some examples, the system includes processing circuitry configured to determine an expected maneuver for the vehicle based on the audio data. In some examples, the processing circuitry is further configured to determine whether to output an alert based on the expected maneuver determined from the audio data.

20 Claims, 9 Drawing Sheets

(56) References Cited

OTHER PUBLICATIONS

Rusko, PhD, et al., "Using Speech Analysis in Voice Communication, A new approach to improve Air Traffic Management Security," Dec. 31, 2016, 6 pp.
U.S. Appl. No. 15/219,235, by Guoqing Wang et al., filed Jul. 25, 2016.
U.S. Appl. No. 15/381,926, by Guoqing Wang et al., filed Dec. 16, 2016.
U.S. Appl. No. 15/524,176, by Ruy C. Brandao et al., filed May 3, 2017.
U.S. Appl. No. 14/886,982, by Guoqing Wang et al., filed Oct. 19, 2015.

\* cited by examiner

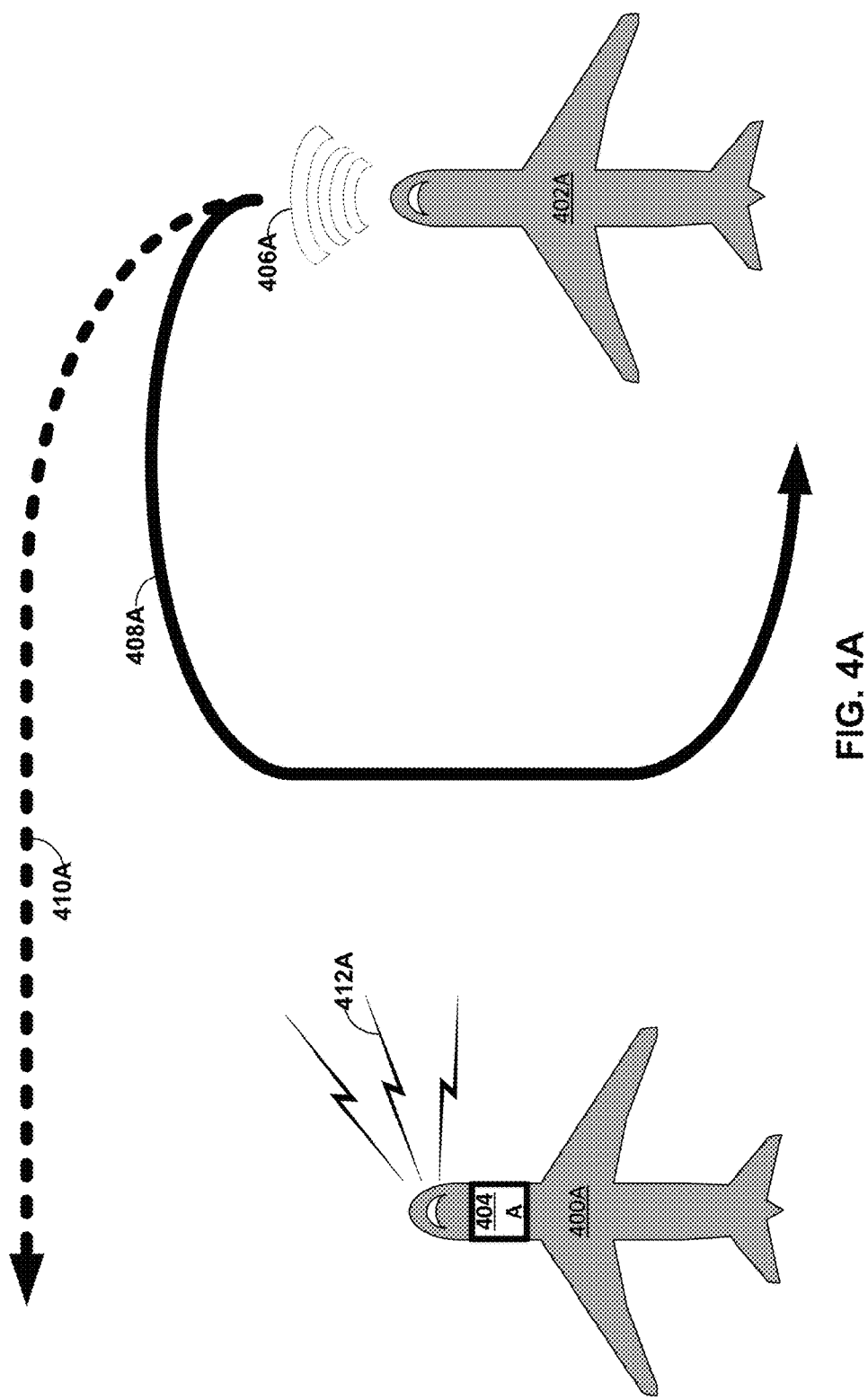

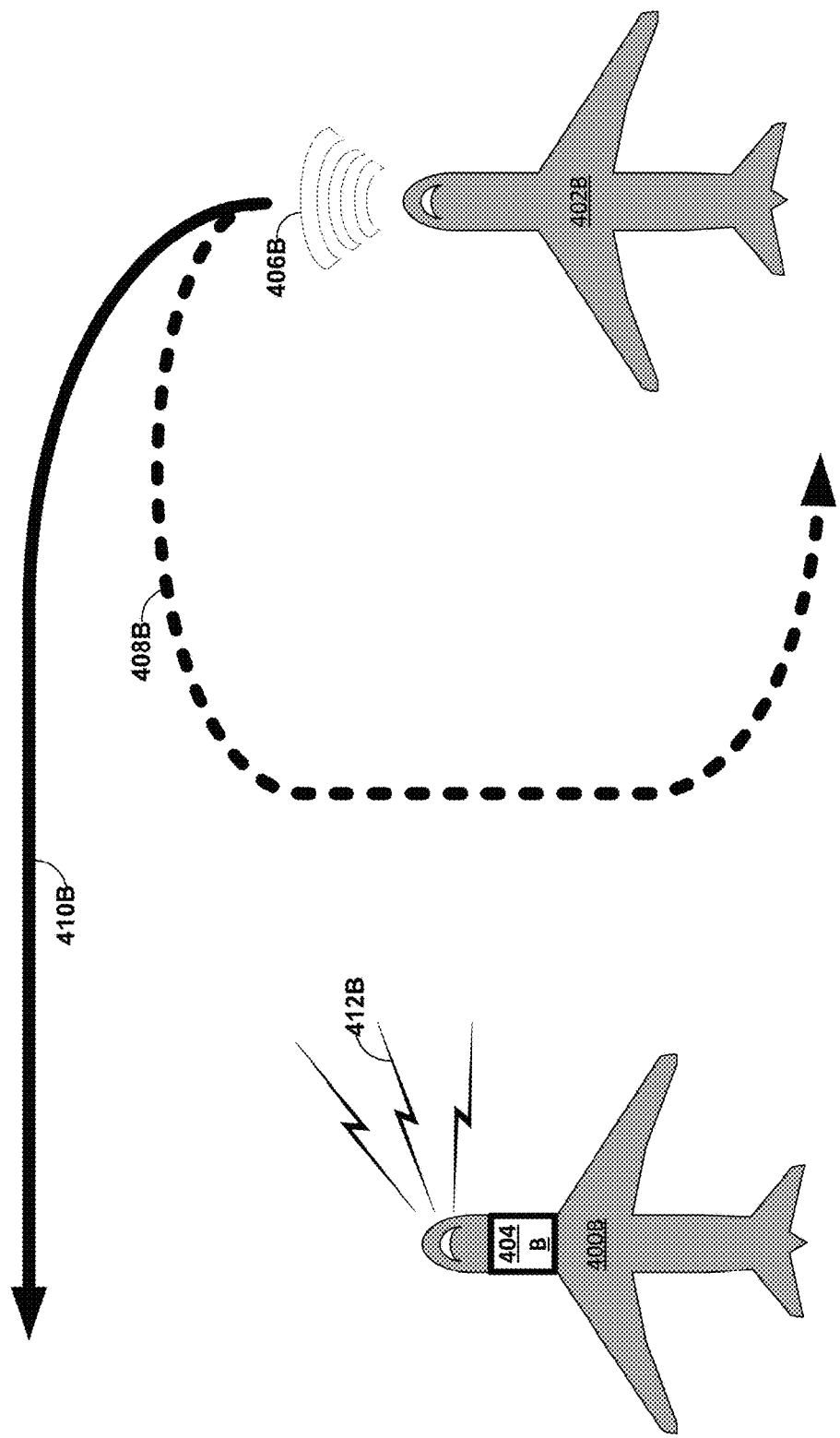

MANEUVER PREDICTION BASED ON AUDIO DATA

TECHNICAL FIELD

The disclosure relates to collision avoidance systems and/or situational awareness systems.

BACKGROUND

An ownship vehicle may include a collision avoidance and/or situational awareness system for alerting its operator to a potential collision with another vehicle by predicting a maneuver based on passive surveillance of signals transmitted from the other vehicle. The system may determine the position of the other vehicle, as well as characteristics such as the velocity and direction of travel. Based on these characteristics, the system may create a protection volume (e.g., a safety envelope) around the ownship vehicle and/or the other vehicle for the purpose of predicting the likelihood of a collision between the two vehicles. The system may also predict a collision between the ownship vehicle and the other vehicles.

SUMMARY

In general, this disclosure describes systems and methods for determining an expected maneuver for a vehicle based on audio data. One example of such a system includes a receiver to receive audio data from a vehicle, where the audio data may indicate a future maneuver for the vehicle. The example system may include processing circuitry configured to determine an expected maneuver based on the audio data and generate, suppress, or allow a collision alert based on the expected maneuver.

In some examples, a system includes a receiver configured to receive audio data from a vehicle. In some examples, the system includes processing circuitry configured to determine an expected maneuver for the vehicle based on the audio data. In some examples, the processing circuitry is further configured to determine whether to output an alert based on the expected maneuver determined from the audio data.

In some examples, a method includes receiving audio data from a vehicle. In some examples, the method also includes determining an expected maneuver for the vehicle based on the audio data. In some examples, the method further includes determining whether to output an alert based on the expected maneuver determined from the audio data.

In some examples, a system includes a radio receiver configured to receive a radio signal from a vehicle, wherein the radio signal includes audio data. In some examples, the system includes a non-transitory memory device configured to store a set of stored features and a set of stored maneuvers. In some examples, the system includes processing circuitry configured to apply a speech-recognition module to the audio data and determine one or more features of the audio data in response to applying the speech-recognition module to the audio data. The processing circuitry is further configured to compare the one or more features of the audio data to the set of stored features and select a stored feature from the set of stored features in response to comparing the one or more features of the audio data to the set of stored features. The processing circuitry is also configured to select an expected maneuver from the set of stored maneuvers, wherein the expected maneuver is associated with the selected stored feature. The processing circuitry is configured to calculate a current collision prediction based on the expected maneuver, compare the current collision prediction and a previous collision prediction, and determine whether to output an alert in response to comparing the current collision prediction and a previous collision prediction.

BRIEF DESCRIPTION OF DRAWINGS

FIG. 4A illustrates a third example application of a system, in accordance with some examples of this disclosure.

FIG. 4B illustrates a fourth example application of a system, in accordance with some examples of this disclosure.

DETAILED DESCRIPTION

Figure 1:
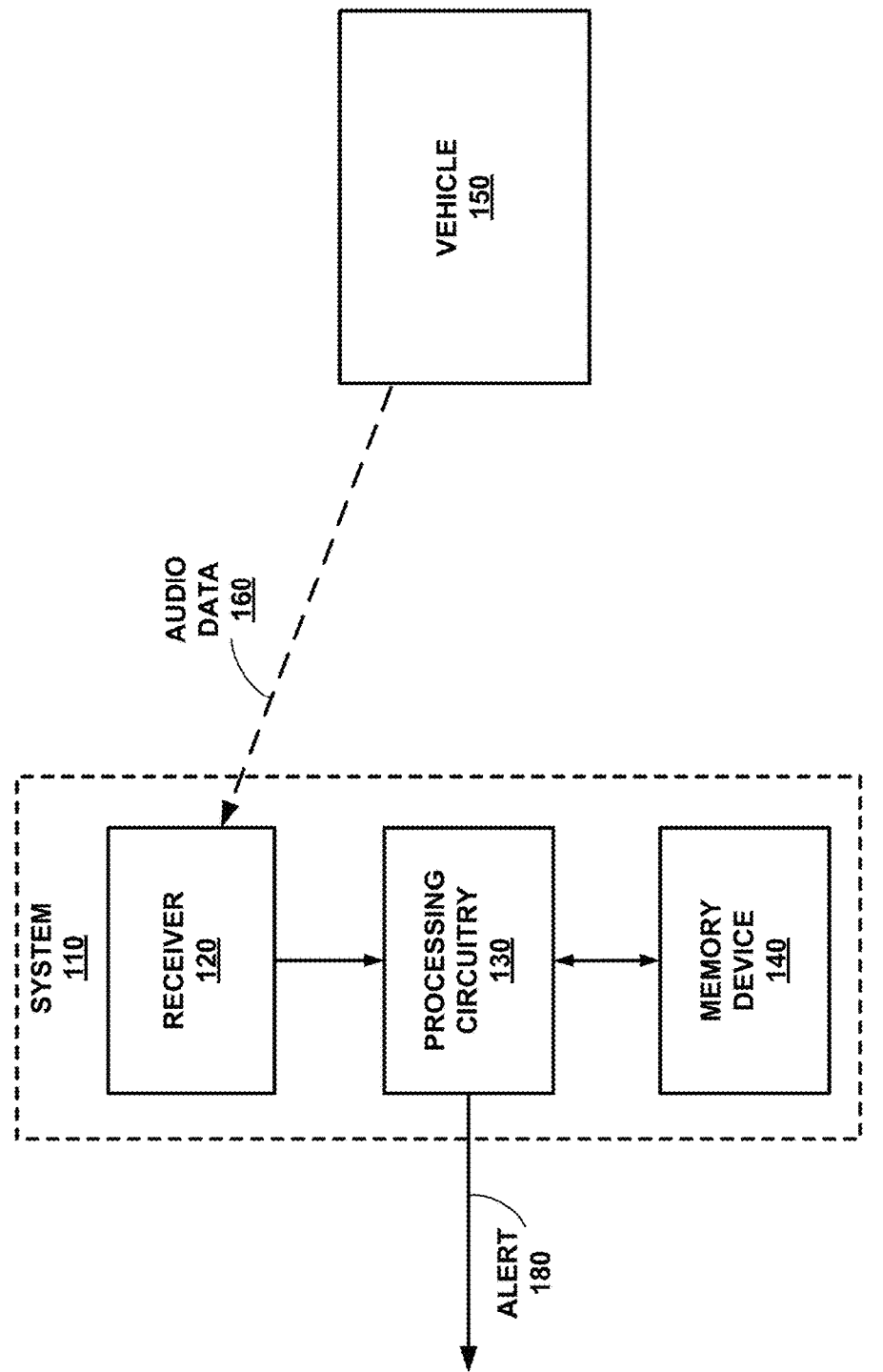
FIG. 1 is a block diagram depicting a system, in accordance with some examples of this disclosure.

An increasing number of vehicles today have assistive collision avoidance or situational awareness systems installed that help the operator of the vehicle to detect and avoid potential collisions with obstacles around the vehicle. An ownship vehicle with a system may receive signals, such as passive automatic dependent surveillance—broadcast (ADS-B) signals, from other vehicles, where the signals may indicate the position and velocity of the transmitting vehicle. One example of such a system is Traffic Situation Awareness with Alerting (TSAA).

However, situational awareness systems are not perfect and may generate false alerts and/or fail to identify legitimate threats. For example, users of current situational awareness systems have observed a phenomenon often referred to as the "wrap-around effect." In the wrap-around effect, a system may correctly recognize that another vehicle has begun or will begin a maneuver in a particular direction (e.g., a turn), but the system may either overestimate or underestimate the extent of the turn (e.g., the total angle). As a result, the system may generate a "nuisance" false collision alert that can confuse or distract the vehicle operator and/or crew. Alternatively, an incorrect prediction due to the wrap-around effect may cause the system to fail to identify a legitimate collision risk, and may either significantly delay, or completely miss, a critical collision alert, possibly resulting in a collision. Nuisance alerts degrade the trust that the operators and crew of vehicles have for situational awareness systems. For example, an operator who has received many nuisance alerts may disregard an important alert at a later time.

This disclosure describes a technique for increasing the accuracy of a situational awareness system, and thereby reducing these "nuisance alerts" and/or reducing failures to issue legitimate alerts, includes incorporating additional information input into the system's collision-prediction software. One such input consists of audio data that an operator or crewmember of a vehicle may produce prior to conducting an intended maneuver. For example, an operator of a first vehicle may announce an upcoming maneuver for the first vehicle by speaking into a microphone. In some examples, the system may be onboard the first vehicle and may be configured to determine an expected maneuver for the first vehicle. Alternatively or additionally, a system onboard the first vehicle may generate a radio signal encoding the audio signal received by the microphone and transmit the radio signal to a second vehicle. A system onboard the second vehicle may be configured to receive the radio signal and determine an expected maneuver based on the audio data encoded in the radio signal.

The system may include a memory device configured to store a speech-recognition module in order to recognize the verbal words and syllables in the audio data. Processing circuitry of the system may be configured to apply the speech-recognition module to the audio data to determine or extract features, where each feature may correspond to approximately ten milliseconds or thirty milliseconds of audio. The processing circuitry may then be configured to compare or classify the extracted features to stored features, where each stored feature is associated with a set of respective stored maneuvers. For example, the set of recorded maneuvers may include features corresponding to words and phrases such as "left," "turn," "bank," "thirty degrees," "northwest," and so on. By comparing the features of the audio data to the set of stored features, the processing circuitry may be configured to select key features that indicate, or are associated with, a maneuver from the set of stored maneuvers. For example, the processing circuitry may determine that the vehicle is not making a turn based on the word "continue" or "maintain" in the audio data. The processing circuitry may extract features that, when compared to stored features, indicate an expected maneuver. Other examples include phrases such as "turning right heading XYZ" or "make a three sixty turn left," by a traffic controller and "three sixty turn left" by a vehicle operator. Aircraft operators may use International Civil Aviation Organization (ICAO) standard phraseology to verbally announce upcoming maneuvers.

An extracted feature may be linked to an intended maneuver for a vehicle, allowing the system to predict a trajectory for the vehicle and determine whether the trajectory is at risk of coinciding with the trajectory of a nearby obstacle, such as a second vehicle, for example, the vehicle on which the system is installed. In some examples, the system may be configured to determine an expected maneuver for the same vehicle on which the system is installed.

The collision prediction based on the audio data may then be compared to previous collision predictions that were generated before the audio data was received, for example, collision predictions based solely on passive surveillance broadcasts or radar scans. The system may either confirm or contradict a previous collision prediction, causing the system to suppress, generate, or allow a collision alert as appropriate.

The systems and methods of this disclosure may increase the accuracy of collision prediction by, for example, reducing the number and frequency of false alerts resulting from incorrectly predicted collisions and reducing the number and frequency of legitimate alerts that are missed. In addition, a system of this disclosure may be configured to generate an alert sooner because of the audio data, as compared to a collision avoidance system that does not analyze audio data. One example of a system includes a receiver to receive audio data broadcast by a vehicle that describes an intended maneuver, and uses this information as an additional input into a collision prediction algorithm. The system may be configured to generate a collision prediction based on the audio data that may either confirm or contradict a previous collision prediction, and determine whether to output an alert (e.g., either generate or suppress a collision alert) as appropriate.

FIG. 1 is a block diagram depicting a system 110, in accordance with some examples of this disclosure. System 110 includes receiver 120, processing circuitry 130, and memory device 140. System 110 may be configured to mount on a vehicle or in a base station, such as a cellular tower or a traffic management facility. In some examples, system 110 may include other functionality, such as surveillance communication (e.g., ADS-B communication), a Global Navigation Satellite System (GNSS), cellular communication, and/or control over vehicle movement.

Receiver 120 may be configured to receive audio data 160 from vehicle 150. Receiver 120 may include a radio receiver and/or a microphone. A radio receiver of receiver 120 may be configured to receive radio signals from vehicle 150, where the radio signals may include audio data 160, such as voice communications from an operator or crewmember of vehicle 150. A microphone of receiver 120 may be configured to receive audio signals from an operator or crewmember of the same vehicle on which system 110 is installed (e.g., vehicle 150). The audio signals may include audio data such as voice communications from the operator or crewmember that indicate an intended future maneuver.

Processing circuitry 130 may be configured to determine an expected maneuver for vehicle 150 based on audio data 160. For example, processing circuitry 130 may be configured to run speech-recognition software in order to extract one or more features from audio data 160. Processing circuitry 130 may be configured to compare the extracted features with a set of stored features that are stored in memory device 140. When processing circuitry 130 detects a match between the extracted features and the stored features, processing circuitry 130 determines an expected maneuver that is associated with the selected stored features. In order to conserve memory space and/or processing power, in some examples a limited-functionality speech-recognition module may suffice to process the audio data, due to the relatively small set of short, standardized protocol features that are likely to be received and are relevant to implementation of the system.

Processing circuitry 130 may be further configured to determine whether to output alert 180 based on the expected maneuver determined from audio data 160. For example, once processing circuitry 130 has determined an expected maneuver, processing circuitry 130 may then retrieve from memory device 140 a set of pre-recorded instructions fully describing that maneuver. The instructions may allow processing circuitry 130 to plot out an expected trajectory for vehicle 150, and determine whether that trajectory is likely to intersect with any other vehicles, and if so, circuitry 130 may output alert 180 as appropriate. In some examples, system 110 may be configured to track obstacles that are transmitting surveillance signals (e.g., ADS-B out signals). When processing circuitry 130 determines whether the trajectories are likely to intersect, processing circuitry 130 has determined whether to output alert 180 based on the expected maneuver.

Processing circuitry 130 may be configured to determine the likelihood of a collision as a percentage, such as from zero to one hundred percent. For example, for a likelihood value spanning an interval of zero to one, a likelihood value of one may indicate a collision, and a likelihood value of zero may indicate that the vehicle is clear of conflict. If the likelihood of a collision exceeds a threshold level, such as ten percent, processing circuitry 130 may be configured to output alert 180 to inform a user of the likelihood of a collision. In some examples, there may be more than one threshold in order to create several levels of alert, such as green (e.g., low likelihood), yellow (e.g., elevated likelihood), and red (e.g., high likelihood). Processing circuitry 130 may be configured to generate a protection volume (e.g., an imaginary bubble) around the expected maneuver of vehicle 150. If processing circuitry 130 determines that another vehicle will collide with the protection volume, then processing circuitry 130 may be configured to output alert 180.

Processing circuitry 130 may be further configured to use audio data 160 to update a previous alert response, for example, by suppressing a collision alert that system 110 has either already begun to issue or is imminently going to generate. Because a verbal indication of an intended route of a vehicle may often be broadcast only prior to initiating an intended maneuver (i.e., prior to a change in position, direction, or velocity of the vehicle), rather than being periodically broadcast with a reliable frequency, it would not be feasible for a system to make collision predictions based on audio data alone. System 110 may, however, receive periodic data input with a reliable frequency from other input sources, for example, from ADS-B communications. System 110 may be constantly running its prediction algorithms, generating a new collision assessment each time system 110 receives one of these broadcasts or signals. However, these automated (i.e., not "intelligent" or human-generated) broadcasts or signals may trigger the wrap-around effect, possibly causing system 110 to generate a "nuisance" false collision alert. Once system 110 receives audio data 160, and uses that data to determine whether a collision is likely to occur, processing circuitry 130 may then compare this current determination with the most-recent previous collision prediction to determine if the two predictions are compatible.

For example, if a current collision prediction based on audio data 160 indicates no risk of collision, whereas the previous collision prediction based on other data input indicates a possible risk of collision, the system may determine that the prediction, based on "intelligent" audio data 160, is more likely a correct prediction, rather than the prediction based solely on automated signals. In this case, system 110 may prevent or suppress collision alert 180 that would have otherwise been generated based on the previous prediction. Alternatively, if a current collision prediction based on audio data 160 indicates a possible risk of collision, whereas the previous collision prediction based on other data input indicates no risk of collision, the system may determine that the prediction based on audio data 160 is more likely correct prediction. The other input data may include passive surveillance broadcasts received by a surveillance receiver of system 110 from vehicle 150, which may include ADS-B data such as position, velocity, direction of travel, and so on. In this case, system 110 may generate collision alert 180 that would not have otherwise been generated based on the previous prediction.

Audio data 160 may be encoded within a radio broadcast (e.g., a radio signal) containing a protocol phrase spoken by the operator of vehicle 150 that indicates that the operator intends to conduct a maneuver associated with the protocol phrase. In this case, receiver 120 would be a radio receiver. If system 110 is installed on vehicle 150, receiver may simply consist of a microphone and audio data 160 may be transmitted via sound waves. Audio data 160 is sent from receiver 120 to processing circuitry 130, where system 110 may attempt to recognize the information contained in the audio data. For example, processing circuitry 130 may implement speech-recognition software to extract or determine features from the spoken-language audio data in order to determine an expected maneuver.

Non-transitory memory device 140 is also in communication with processing circuitry 130. Memory device 140 may be configured to store a set of data indicating feature-based maneuver protocols, where each feature is linked to an associated maneuver. For example, memory device 140 may be configured to store a feature-based, standardized protocol phrase such as "turn three-hundred-sixty degrees left" along with a set of computer-readable instructions fully describing the mechanics of a complete turn maneuver to the left.

Processing circuitry 130 may extract features from audio data 160 by analyzing short portions of audio data 160, such as five-millisecond portions, ten-millisecond portions, thirty-millisecond portions, fifty-millisecond portions, or one-hundred-millisecond portions. The extracted feature may relate to the volume, amplitude, pitch, and/or frequency of audio data 160. If a certain threshold similarity is met between an extracted feature and a stored feature, processing circuitry 130 may be configured to retrieve the corresponding maneuver instructions associated with that stored feature from memory device 140.

Processing circuitry 130 may then combine these maneuver instructions with other information, such as current position, velocity, and/or direction information, to predict a future trajectory for vehicle 150, and then determine if that trajectory is likely to intersect with the trajectory of a second vehicle or other object, causing a collision. When the system 110 determines that a potential collision may occur, an alert 180 is sent to the operator of the ownship vehicle so that the operator make take evasive action. The alert 180 may take the form of an audio alarm, a visual display message, or both.

Vehicle 150 can be any mobile object or remote object. For example, vehicle 150 may be an aircraft such as an airplane, a helicopter, or a weather balloon, or a space vehicle such as a satellite or spaceship. An "aircraft" as described and claimed herein may include any fixed-wing or rotary-wing aircraft, airship (e.g., dirigible or blimp buoyed by helium or other lighter-than-air gas), suborbital space-plane, spacecraft, expendable or reusable launch vehicle or launch vehicle stage, or other type of flying device. An "aircraft" as described and claimed herein may also include any crewed or unmanned craft (e.g., unmanned aerial vehicle (UAV), flying robot, or automated cargo or parcel-delivery drone or other craft). In some examples, vehicle 150 may include a land vehicle such as an automobile or a water vehicle such as a ship or a submarine. In some examples, system 110 may be installed on vehicle 150 and configured to receive audio data 160 by a microphone of receiver 120, or vehicle 150 may be remote from system 110 and configured to encode and transmit a radio signal including audio data 160.

Audio data 160 may consist of any navigation information that originated in the form of a sound wave. One example of audio data 160 is a brief, standardized, protocol phrase spoken by an operator or crewmember of a vehicle that indicates that the operator intends to maneuver the vehicle in a certain direction and/or at a certain velocity. This audio data 160 may be directly received by receiver 120 in its original sound-wave form, for example, by a microphone, or alternatively, may be received encoded within a radio wave by a radio receiver.

Alert 180 may be a visual alert, an audible alert, and/or a tactile alert (e.g., a vibration). Processing circuitry 130 may be configured to output alert 180 via any output device, including a display or a speaker. Processing circuitry 130 may be configured to control an ownship vehicle to take an evasive maneuver in response to determining the expected maneuver of vehicle 150. In some examples, processing circuitry 130 may be configured to output alert 180 by transmitting a signal to inform vehicles and/or base stations of the expected maneuver.

Figure 2:
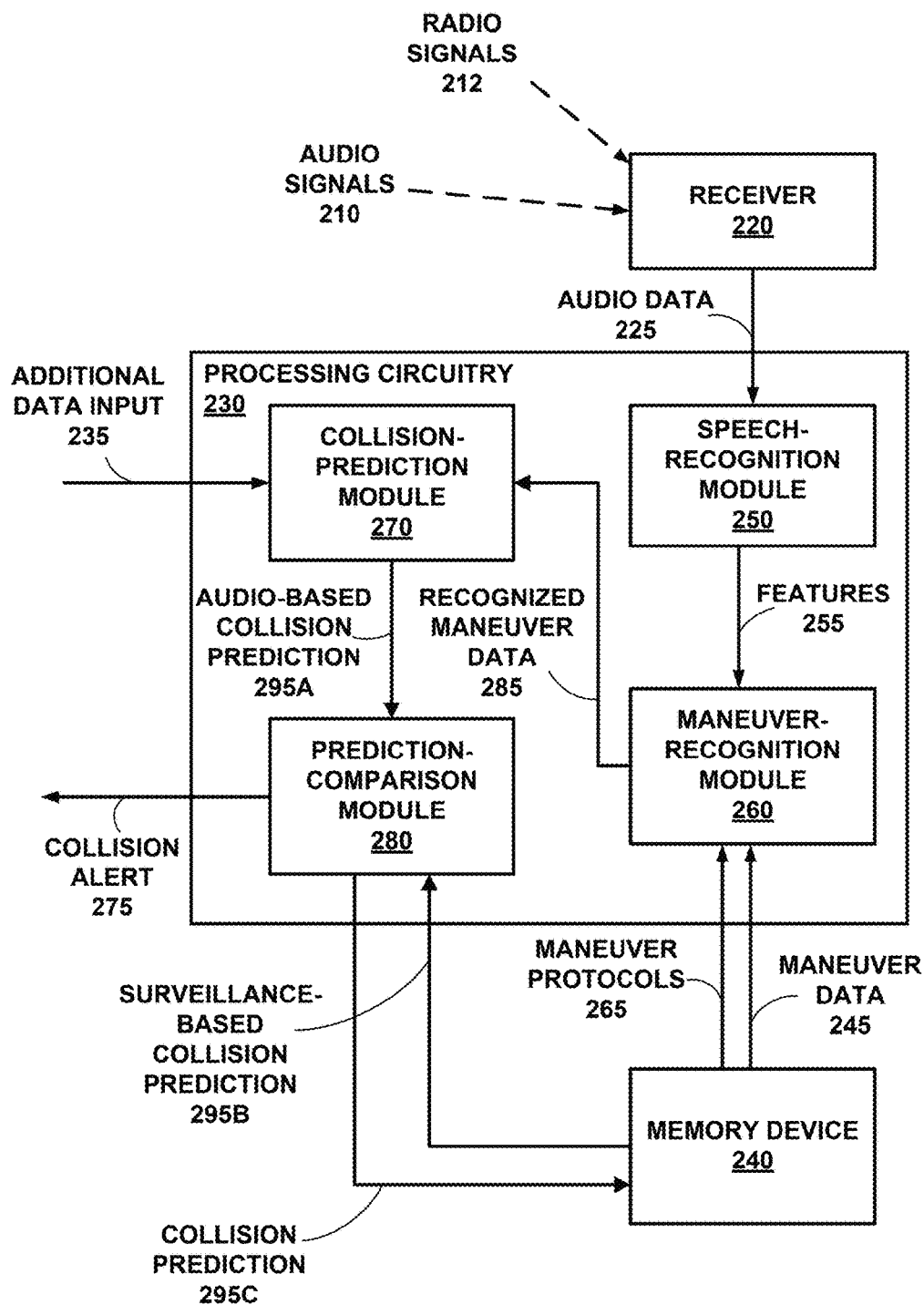
FIG. 2 is a block diagram depicting some internal components of a system, in accordance with some examples of this disclosure.

FIG. 2 is a block diagram depicting the processing circuitry involved in a system (corresponding to processing circuitry 130 of FIG. 1). Audio data 225 indicating an intended maneuver may be received by receiver 220 and sent to a speech-recognition module 250. Audio data 225 may include information about a vehicle, such as a callsign. For example, the operator of the vehicle may introduce the vehicle by an identification number, a flight number, and/or another method of identifying the vehicle.

Speech-recognition module 250 may apply speech-recognition software to extract or determine features 255 from audio data 225. In some examples, processing circuitry 230 may be configured to perform a waveform analysis of audio data 225 in order to extract features 255. Maneuver recognition module 260 may then compare features 255 to a set of stored features that is stored to memory device 240. Maneuver-recognition module 260 may also receive a set of pre-recorded maneuver protocols 265 from permanent storage within memory device 240. Within maneuver-recognition module 260, processing circuitry 230 may be configured to compare features 255 to the stored features to search for a threshold similarity between features 255 and the stored features, indicating a match that may be associated with one or more maneuver protocols of maneuver protocols 265. When a match is determined, maneuver-recognition module 260 may be configured to retrieve from memory device 240 complete maneuver data 245 corresponding to identified maneuver protocol 265. Maneuver-recognition module 260 sends complete maneuver data 245, which fully describes the mechanics of the maneuver, to collision-prediction module 270.

Collision-prediction module 270 may also be configured to receive additional data input 235 indicating the current positions, velocities, and/or directions of one or more vehicles or other obstacles, so that collision-prediction module 270 may plot out a future trajectory for the vehicle making the maneuver and compare that future trajectory to the trajectory for a second entity. One example of additional data input 235 for collision-prediction module 270 is an ADS-B transmission, in which a vehicle uses satellite navigation to calculate its location, and then broadcasts this information. Another example of additional data input 235 is the return signal from a radar scan.

Collision-prediction module 270 may be configured to compare the two trajectories to determine whether the vehicle and a second entity meet a threshold probability of attaining a threshold proximity to each other in the future. If collision-prediction module 270 determines that the two trajectories meet or exceed a threshold probability, processing circuitry 230 may be configured to generate collision alert 275 and send that alert to the operators of any and/or all vehicles involved in the potential collision so that the operators make take evasive action. Processing circuitry 230 may be configured to output collision alert 275 as an audible alert, a visual alert, a tactile alert, and/or an alert that processing circuitry 230 causes a transmitter to transmit a vehicle or base station.

Collision-prediction module 270 may also be configured to calculate audio-based collision prediction 295A based on an expected maneuver for a vehicle, where processing circuitry 230 has determined the expected maneuver based on audio data 225. Prediction-comparison module 280 may be configured to compare audio-based collision prediction 295A to collision prediction 295B and/or 295C. Prediction-comparison module 280 may be configured to determine whether to output collision alert 275 in response to the comparison. For example, if audio data 225 includes an announced maneuver by the vehicle operator that is different than a maneuver predicted based on additional data input 235, prediction-comparison module 280 may be configured to suppress an alert based on additional data input 235 or generate collision alert 275 if additional data input 235 does not support an alert. However, audio-based collision prediction 295A may not take absolute priority over surveillance-based collision prediction 295B. Modules 270 and 280 may be configured to control which of collision predictions 295A and 295B takes precedence. For example, surveillance-based collision prediction 295B may take precedence over collision prediction 295A after some threshold time duration or threshold distance traveled by the target vehicle.

Processing circuitry 230 may also be configured to use audio data 225 to update a previous collision response. For example, each time that processing circuitry 230 makes a collision assessment, including assessments involving both positive collision predictions and negative collision predictions, processing circuitry 230 may determine features from audio-based collision prediction 295A. Audio-based collision prediction 295A may include information indicating which entities were involved in the assessment, a log of the predicted trajectories, an indication of the final collision determination (e.g., the percent chance of collision or proximity), and the corresponding alert response. Collision-prediction module 270 may send audio-based collision prediction 295A to prediction-comparison module 280.

Simultaneously, memory device 240 may send surveillance-based collision prediction 295B to prediction-comparison module 280, which may then compare audio-based collision prediction 295A to surveillance-based collision prediction 295B to determine if the two predictions are compatible. For example, if the two prediction assessments involve the same set of obstacles (e.g., the same two vehicles), but reach conflicting final collision determinations, processing circuitry may then determine which of the two assessments takes priority (i.e., which of the two collision predictions is more likely correct). Processing circuitry 230 may be configured to determine surveillance-based collision prediction 295B based on surveillance signals, such as ADS-B signals, received from another vehicle.

For example, a collision prediction based on "intelligent" audio data 225 as one of its inputs may take priority over a collision prediction based solely on automated signals, such as ADS-B or radar. Similarly, a more-recent collision prediction (i.e., audio-based collision prediction 295A) may be more likely to take priority over a less-recent collision prediction (i.e., surveillance-based collision prediction 295B), due to the fact that it contains more up-to-date information. A collision prediction that is both more recent and based on audio data 225 may be much more likely to take priority over an older prediction based solely on automated signals. Another example of a priority determination may be made based on the percent chance of collision. For example, a significant increase or decrease in collision probability may trigger priority status for the corresponding collision prediction.

The system may receive location information for a vehicle (e.g., ADS-B) at a rate of approximately once per second. In contrast, processing circuitry 230 may receive audio signals 210 and radio signals 212 less often than surveillance signals, such as ADS-B. In some examples, processing circuitry 230 may be configured to retain audio-based collision prediction 295A, which is based on audio data 225, for a duration of two seconds, five seconds, or ten seconds. Processing circuitry 230 may then be configured to compare audio-based collision prediction 295A to collision predictions based on updated location information. Thus, processing circuitry 230 may be configured to trust audio-based collision prediction 295A even after audio-based collision prediction 295A is older than surveillance-based collision prediction 295B. After a distance-traveled threshold or a time threshold since collision-prediction module 270 determined collision prediction 295A, surveillance-based collision prediction 295B may have priority over audio-based collision prediction 295A.

Once processing circuitry 230 has determined which of the two predictions takes priority, processing circuitry 230 may update collision alert 275 to reflect the higher-priority prediction, for example, by suppressing an obsolete "nuisance" alert, or alternatively, by generating a critical alert. Whichever collision prediction was determined to have priority may become the collision prediction 295C, and may be sent to memory device 240, where collision prediction 295C may override surveillance-based collision prediction 295B.

Figure 3A:
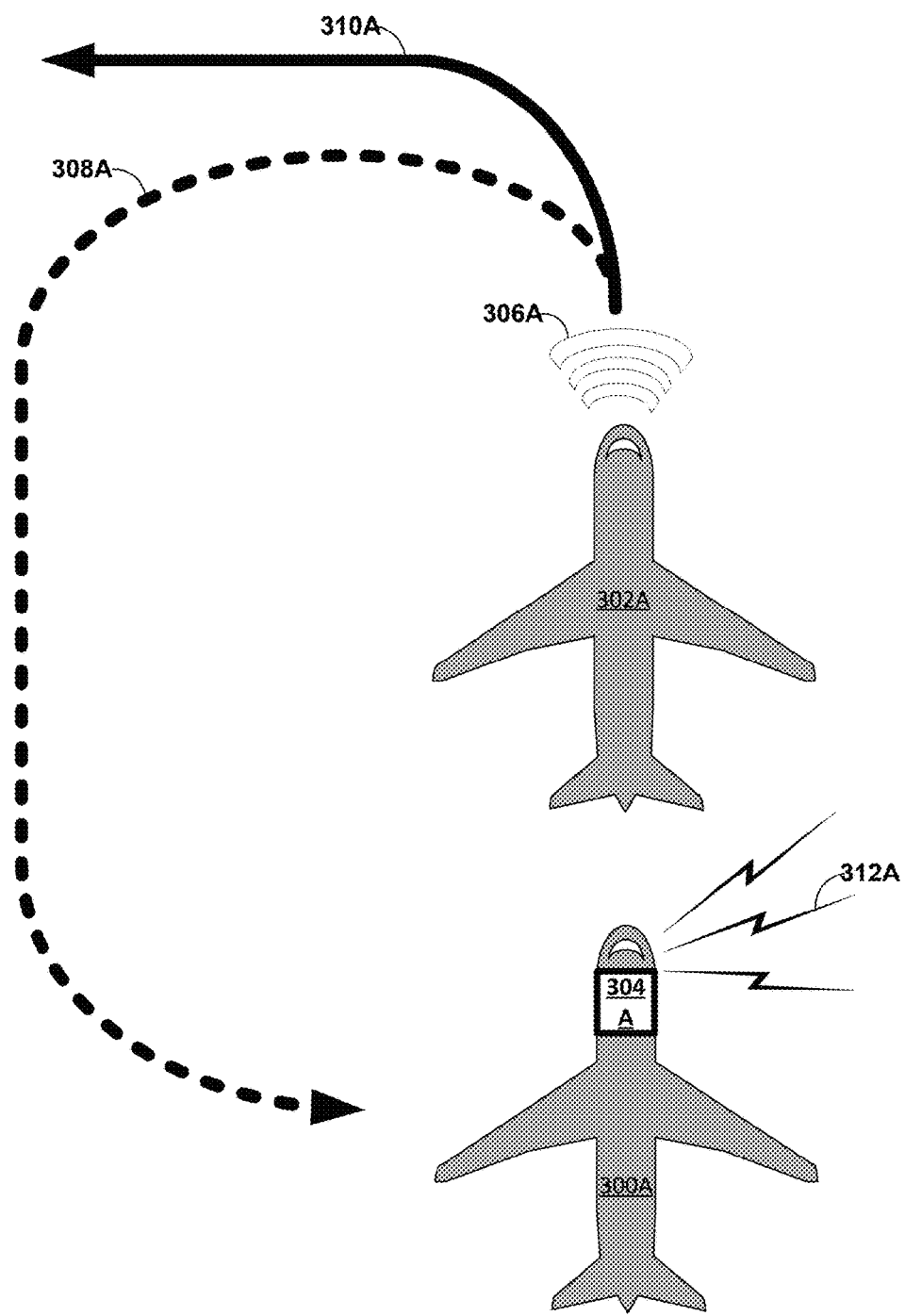
FIG. 3A illustrates a first example application of a system, in accordance with some examples of this disclosure.

FIG. 3A illustrates a first example application of system 304A, in accordance with some examples of this disclosure. Either or both of vehicles 300A and 302A may include a system with audio capabilities as described herein. In the example of FIG. 3A, aircraft 302A prepares to initiate a ninety-degree turn 310A to its left. Meanwhile, system 304A installed onboard aircraft 300A receives information regarding the positions, velocities, and directions of the two vehicles, for example, via ADS-B transmissions from aircraft 302A, or radar scans from aircraft 300A. These automated data signals may trigger a phenomenon often referred to as the "wrap-around" effect, in which system 304A may correctly identify that nearby aircraft 302A will conduct a turn maneuver to the left, but may either overestimate or underestimate the extent of the turn. For example, system 304A may overestimate the extent of the turn and incorrectly predict that aircraft 302A will conduct a maneuver consisting of a complete wrap-around turn 308A into the flight path of aircraft 300A, causing a collision. This incorrect prediction may result in system 304A generating a "nuisance" false collision alert 312A sent to the pilot of aircraft 300A.

Prior to initiating the left-turn maneuver, however, pilot of aircraft 302A may announce the intended maneuver by broadcasting a standardized protocol phrase 306A over radio, which is then received by system 304A. System 304A then applies speech-recognition software to the received radio broadcast to recognize the intended maneuver of aircraft 302A as a ninety-degree left turn 310A, thereby contradicting the previous collision prediction and suppressing or disabling nuisance alert 312A.

Figure 3B:
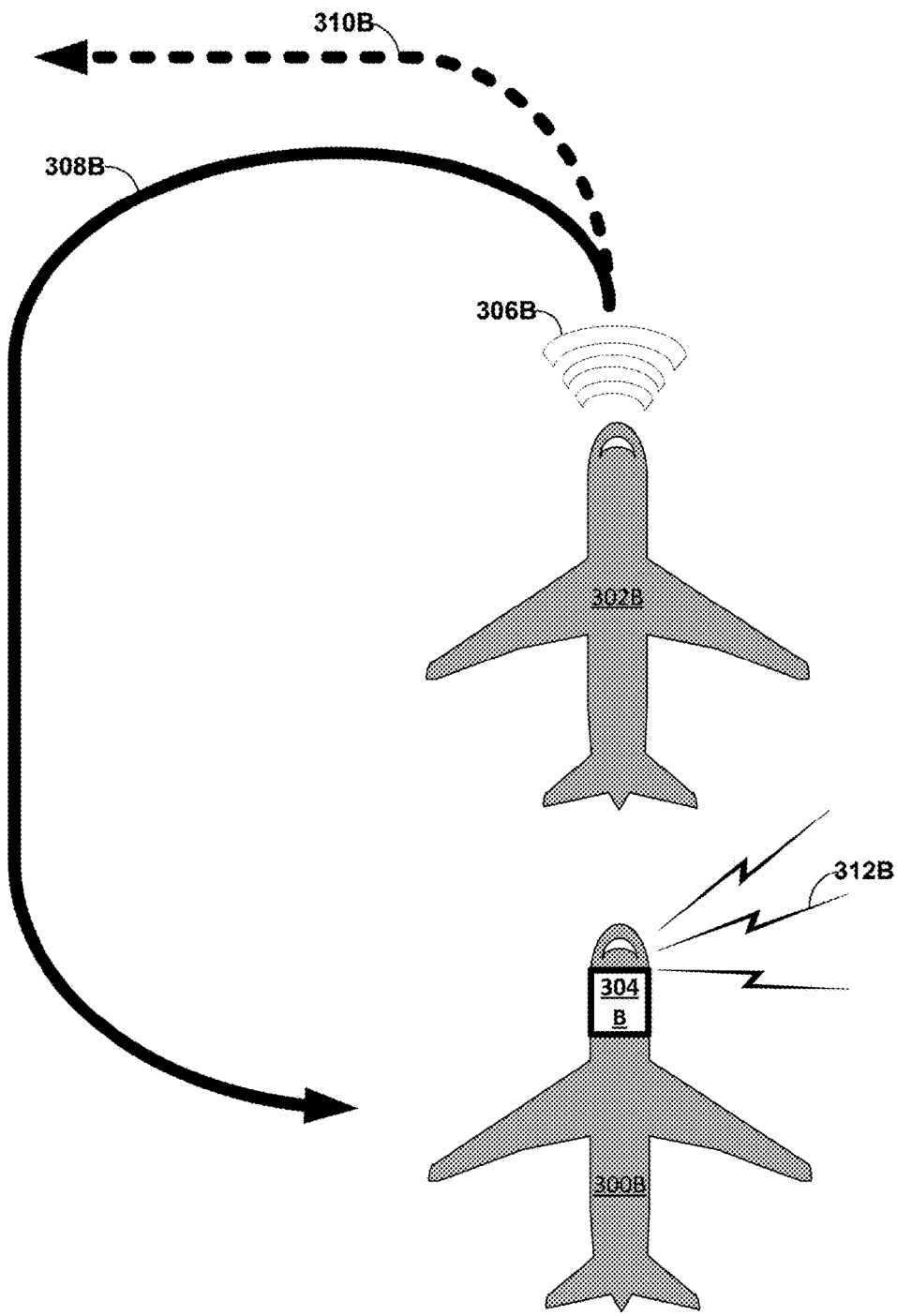
FIG. 3B illustrates a second example application of a system, in accordance with some examples of this disclosure.

FIG. 3B illustrates a second example application of a system 304B, in accordance with some examples of this disclosure. Aircraft 302B prepares to initiate a complete wrap-around turn maneuver 308B to its left, into the flight path of aircraft 300B. Meanwhile, system 304B installed onboard aircraft 300B receives information regarding the positions, velocities, and directions of the two vehicles, for example, via ADS-B transmissions from aircraft 302B, or radar scans from aircraft 300B. These automated data signals may trigger the wrap-around effect. For example, system 304B may correctly identify that nearby aircraft 302B will conduct a turn maneuver to the left, but may underestimate the extent of the turn and predict that aircraft 302B will conduct a maneuver consisting of a ninety-degree turn 310B safely away from the flight path of aircraft 300B. This incorrect prediction may result in system 304B failing to generate a legitimate collision alert, or otherwise significantly delaying a collision alert, placing both aircraft in danger of a collision.

Prior to initiating the maneuver, however, the pilot of aircraft 302B may announce the intended maneuver by broadcasting a standardized protocol phrase 306B over radio, which is then received by system 304B. System 304B then applies speech-recognition software to the received radio broadcast to recognize the intended maneuver of aircraft 302B as a complete wrap-around turn 308B, thereby contradicting the previous collision prediction and generating critical collision alert 312B.

FIG. 4A illustrates a third example application of system 404A, in accordance with some examples of this disclosure. In the example of FIG. 4A, aircraft 402A prepares to initiate a complete wrap-around turn maneuver 408A to its left. Meanwhile, system 404A installed onboard aircraft 400A receives information regarding the positions, velocities, and directions of the two vehicles, for example, via ADS-B transmissions from aircraft 402A, or radar scans from aircraft 400A. These automated data signals may trigger the wrap-around effect. For example, system 404A may correctly identify that nearby aircraft 402A will conduct a turn maneuver to the left, but may underestimate the extent of the turn and predict that aircraft 402A will conduct a maneuver consisting of a ninety-degree turn 410A into the flight path of aircraft 400A, causing a collision. This incorrect prediction may result in system 404A generating a "nuisance" false collision alert 412A sent to the pilot of aircraft 400A.

Prior to initiating the maneuver, however, the pilot of aircraft 402 may announce the intended maneuver by broadcasting a standardized protocol phrase 406A over radio, which is then received by system 404A. System 404A then applies speech-recognition software to the received radio broadcast to recognize the intended maneuver of aircraft 402A as a complete wrap-around turn 408A, thereby contradicting the previous collision prediction and disabling nuisance alert 412A.

FIG. 4B illustrates a second example application of system 404B, in accordance with some examples of this disclosure. Aircraft 402B prepares to initiate a ninety-degree turn maneuver 410B to its left, into the flight path of aircraft 400B. Meanwhile, system 404B installed onboard aircraft 400B receives information regarding the positions, velocities, and directions of the two vehicles, for example, via ADS-B transmissions from aircraft 402B, or radar scans from aircraft 400B. These automated data signals may trigger the wrap-around effect. For example, system 404B may correctly identify that nearby aircraft 402B will conduct a turn maneuver to the left, but may overestimate the extent of the turn and predict that aircraft 402B will conduct a maneuver consisting of a complete wrap-around turn 410B safely away from the flight path of aircraft 400B. This incorrect prediction may result in system 404B failing to generate a legitimate collision alert, or otherwise significantly delaying a collision alert, placing both aircraft in danger.

Prior to initiating the maneuver, however, the pilot of aircraft 402B may announce the intended maneuver by broadcasting a standardized protocol phrase 406B over radio, which is received by system 404B. System 404B then applies speech-recognition software to the received radio broadcast to recognize the intended maneuver of aircraft 402B as a ninety-degree left turn 410B, thereby contradicting the previous collision prediction and generating critical collision alert 412B.

Figure 5:
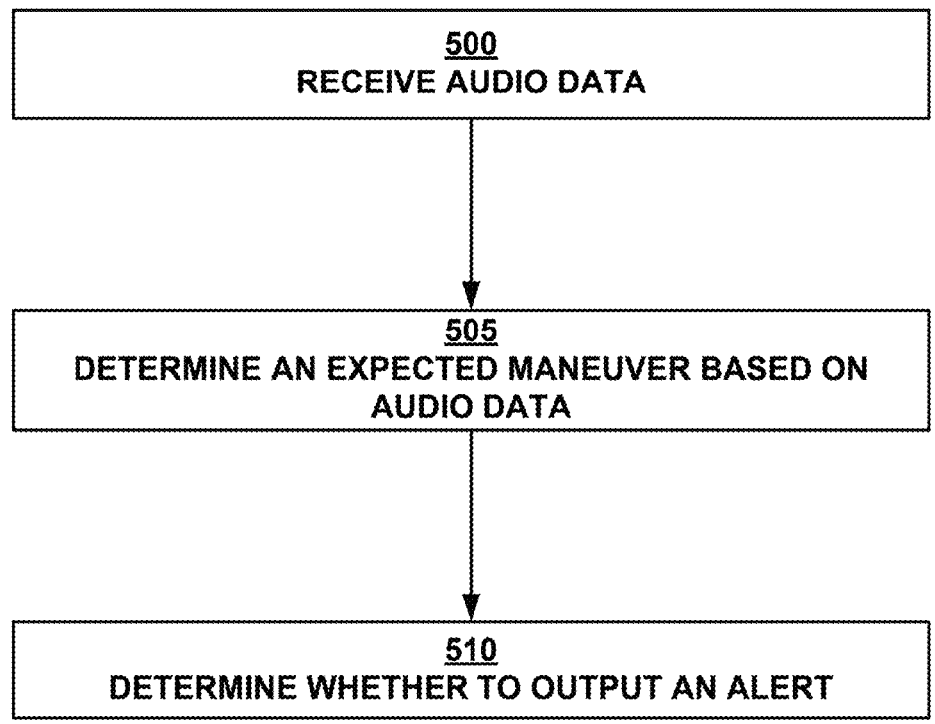
FIG. 5 is a flow diagram depicting a method of using audio data in a system, in accordance with some examples of this disclosure.

FIG. 5 is a flow diagram depicting a method of using audio data in a system, in accordance with some examples of this disclosure. The method of FIG. 5 is described with reference to system 110 of FIG. 1, including processing circuitry 130, although other components may perform similar techniques such as processing circuitry 230. System 110 receives audio data 160, for example, via a radio broadcast from vehicle 150 (500). Processing circuitry 130 determines an expected maneuver based on audio data 160 (505), for example, by extracting features from audio data 160 and comparing the extracted features to a set of stored features to determine an expected maneuver that is associated with the closest match of the stored features. Processing circuitry 130 may then determine whether to output collision alert 180 (510), for example, by calculating a predicted trajectory based on the expected maneuver and determining whether the predicted trajectory indicates a threshold likelihood of a collision.

Figure 6:
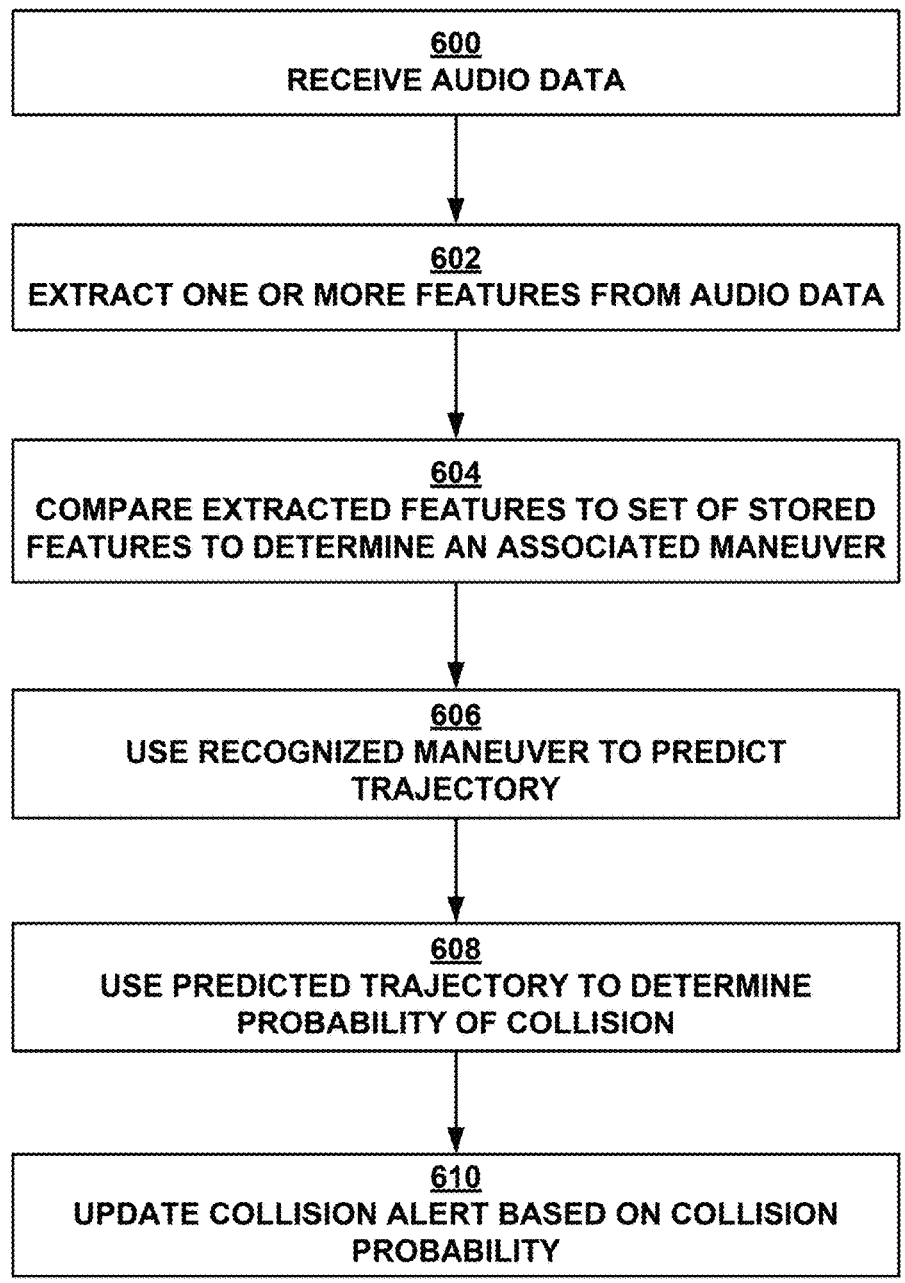
FIG. 6 is a flow diagram depicting a method of using audio data in a system, in accordance with some examples of this disclosure.

FIG. 6 is a flow diagram depicting a method of using audio data in a system, in accordance with some examples of this disclosure. The method of FIG. 6 is described with reference to system 110 of FIG. 1, including processing circuitry 130, although other components may perform similar techniques such as processing circuitry 230. System 110 receives audio data 160, for example, via a radio broadcast, that indicates an intended maneuver by the operator of vehicle 150 (600). Audio data 160 may originate from the operator of the ownship vehicle on which the system is installed, or from the operator of a different vehicle. System 110 may use speech-recognition software to extract or determine one or more features from audio data 160 (602). Processing circuitry 130 may be configured to extract features by analyzing short portions of audio data 160.

Processing circuitry 130 may be configured to compare the extracted features to a set of stored features that are stored within memory device 140 of system 110 (604). If a match is found between the extracted features and one or more stored features, system 110 determines an expected maneuver (e.g., a recognized maneuver) from a set of stored maneuvers, where the expected maneuver is associated with the extracted feature. The expected maneuver may include sufficient detail so that processing circuitry 130 can calculate a predicted trajectory comprising future position and velocity information when supplied with current position, velocity, and/or direction information (606). Processing circuitry may then be configured to compare this trajectory with a predicted trajectory for a second entity, including another vehicle or other obstacle, to determine whether the two trajectories intersect at any point, indicating a risk of collision (608). This second trajectory may be calculated using other input information, such as ADS-B transmissions or radar scans.

System 110 may be configured to use the collision prediction to update an alert response resulting from a previous collision prediction that was not based on audio data 160 (610). For example, system 110 may suppress or disable collision alert 180 triggered by a previous collision prediction, or alternatively, generate collision alert 180 that the previous collision prediction had determined to be unnecessary based on a low probability of collision.

Figure 7:
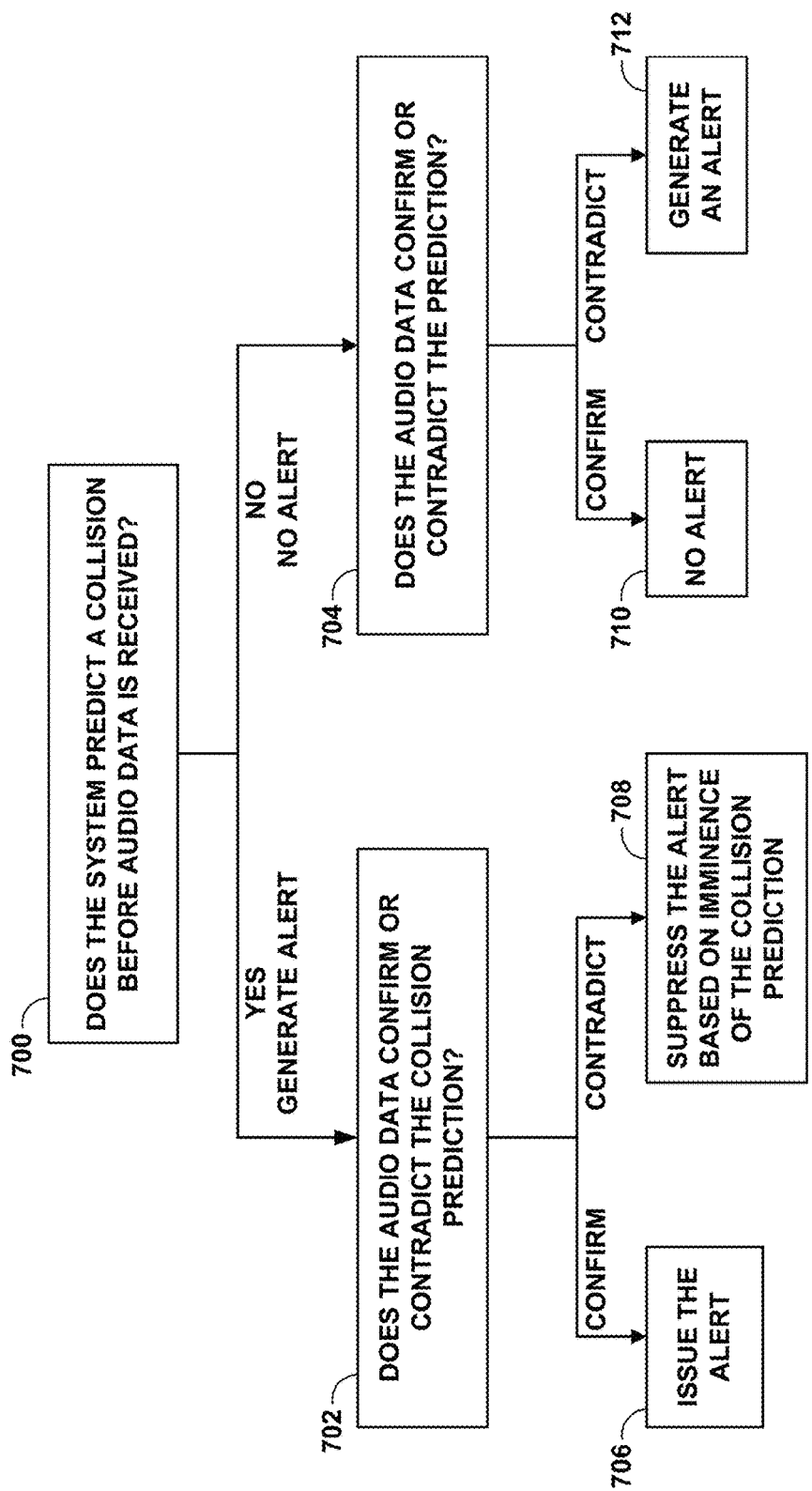
FIG. 7 is a flow diagram depicting an internal logic structure governing a system, in accordance with some examples of this disclosure.

FIG. 7 is a flow diagram depicting an internal logic structure governing a system, in accordance with some examples of this disclosure. The structure of FIG. 7 is described with reference to system 110 of FIG. 1, including processing circuitry 130, although other components may perform similar techniques. In the example of FIG. 7, system 110 generates a new collision prediction each time a signal is received, such as via ADS-B or radar, indicating the position or velocity of an entity, such as vehicle 150 (700). Immediately before receiver 120 receives audio data 160, system 110 will likely already have either predicted a collision with vehicle 150 and generated a collision alert (702) or predicted no collision with vehicle 150 and not generated a collision alert (704), based on this signal alone. At some point, system 110 receives audio data originating from vehicle 150, indicating that the operator of vehicle 150 intends to make a maneuver.

Once audio data 160 is received, system 110 uses the audio data to make an "updated" current collision prediction, which may either confirm (706, 710) or contradict (708, 712) the previous collision prediction. In the event that both the current and the previous predictions indicate a risk of collision, system 110 may allow the alert from the previous prediction to be issued (706). If, however, the updated prediction indicates that the previous collision prediction was incorrect, and that there is actually no risk of collision, system 110 may then suppress or disable the alert that had previously been generated based on the imminence of the previous collision prediction (708). For example, if the previous collision prediction includes a prediction of an imminent collision, processing circuitry 130 may be configured to output the alert, despite the contradictory audio data. If the previous collision prediction includes a prediction of a non-imminent collision, processing circuitry 130 may be configured to suppress the alert based on the contradictory audio data. The imminence of a predicted collision may be based on the predicted time-to-collision. For example, processing circuitry 130 may be configured to apply a threshold of thirty seconds when determining to suppress an alert based on contradictory audio data. If processing circuitry 130 predicts that the collision will occur in less than thirty seconds based on the non-audio data, processing circuitry 130 may determine to output the alert (i.e., not suppress the alert). If processing circuitry 130 predicts that the collision will occur in more than thirty seconds based on the non-audio data, processing circuitry 130 may determine to suppress the alert.

In the event that both the neither the current nor the previous predictions indicate a risk of collision, system 110 will not issue an alert, and will wait for another signal to generate a new collision prediction (710). If, however, the updated prediction indicates that the previous collision prediction was incorrect, and that there actually is a significant risk of collision, system 110 may then generate a collision alert (712).

Example 1

A system includes a receiver configured to receive audio data from a vehicle. In some examples, the system includes processing circuitry configured to determine an expected maneuver for the vehicle based on the audio data. In some examples, the processing circuitry is further configured to determine whether to output an alert based on the expected maneuver determined from the audio data.

Example 2

The system of example 1, further including a non-transitory memory device configured to store a set of stored features, wherein the processing circuitry is configured to determine the expected maneuver by at least applying a speech-recognition module to the audio data, determining one or more features of the audio data in response to applying the speech-recognition module to the audio data, and comparing the one or more features of the audio data to the set of stored features.

Example 3

The system of examples 1-2 or any combination thereof, wherein the processing circuitry is configured to determine the expected maneuver by at least selecting a stored feature from the set of stored features in response to comparing the one or more features of the audio data to the set of stored features.

Example 4

The system of examples 1-3 or any combination thereof, wherein the non-transitory memory device is further configured to store a set of stored maneuvers. Each stored feature from the set of stored features is associated with a respective recorded maneuver from the set of stored maneuvers. The processing circuitry is configured to determine the expected maneuver by at least determining the respective stored maneuver that is associated with the selected stored feature.

Example 5

The system of examples 1-4 or any combination thereof, wherein the vehicle is another vehicle, and the receiver includes a radio receiver configured to receive radio signals including the audio data from the other vehicle. The system is configured to be installed on an ownship vehicle, and the processing circuitry is configured to determine whether to output the alert by at least determining whether the other vehicle is likely to collide with the ownship vehicle while performing the expected maneuver.

Example 6

The system of examples 1-5 or any combination thereof, wherein the vehicle is an ownship vehicle on which the system is installed. The receiver includes a microphone configured to receive the audio data from the ownship vehicle, and the processing circuitry is configured to determine whether to output the alert by at least determining whether the ownship vehicle is likely to collide with an object.

Example 7

The system of examples 1-6 or any combination thereof, wherein the processing circuitry is configured to determine whether to output the alert based on the expected maneuver by at least calculating a current collision prediction based on the expected maneuver, comparing the current collision prediction to a previous collision prediction, and determining whether to output the alert in response to comparing the current collision prediction to the previous collision prediction.

Example 8

The system of examples 1-7 or any combination thereof, wherein the processing circuitry is configured to determine whether to output the alert in response to comparing the current collision prediction to the previous collision prediction by at least determining that the current collision prediction indicates that no collision will occur, determining that the current collision prediction contradicts the previous collision prediction, and suppressing the alert from the previous collision prediction in response to determining that the current collision prediction contradicts the previous collision prediction.

Example 9

The system of examples 1-8 or any combination thereof, wherein the receiver includes a radio receiver configured to receive radio signals including the audio data from the vehicle. The system further includes a surveillance receiver configured to receive surveillance broadcasts from the vehicle. The processing circuitry is further configured to determine the previous collision prediction based on the surveillance broadcasts received by the surveillance receiver from the vehicle.

Example 10

A method includes receiving audio data from a vehicle. In some examples, the method also includes determining an expected maneuver for the vehicle based on the audio data. In some examples, the method further includes determining whether to output an alert based on the expected maneuver determined from the audio data.

Example 11

The method of example 10, wherein determining the expected maneuver includes applying a speech-recognition module to the audio data, determining one or more features of the audio data in response to applying the speech-recognition module to the audio data, and comparing the one or more features of the audio data to a set of stored features.

Example 12

The method of examples 10-11 or any combination thereof, wherein determining the expected maneuver includes selecting a stored feature from the set of stored features in response to comparing the one or more features of the audio data to the set of stored features.

Example 13

The method of examples 10-12 or any combination thereof, wherein determining the expected maneuver includes determining a respective stored maneuver from a set of stored maneuvers that is associated with the selected stored feature, wherein each stored feature from the set of stored features is associated with a respective recorded maneuver from the set of stored maneuvers.

Example 14

The method of examples 10-13 or any combination thereof, wherein determining whether to output the alert includes calculating a current collision prediction based on the expected maneuver, comparing the current collision prediction to a previous collision prediction, and determining whether to output the alert in response to comparing the current collision prediction to the previous collision prediction.

Example 15

The method of examples 10-14 or any combination thereof, wherein determining whether to output the alert in response to comparing the current collision prediction to the previous collision prediction further includes determining that the current collision prediction indicates that no collision will occur, determining that the current collision prediction contradicts the previous collision prediction, and suppressing the alert from the previous collision prediction in response to determining that the current collision prediction contradicts the previous collision prediction.

Example 16

The method of examples 10-15 or any combination thereof, wherein determining whether to output the alert in response to comparing the current collision prediction to the previous collision prediction further includes determining that the current collision prediction indicates that no collision will occur, determining that the current collision prediction confirms the previous collision prediction, and outputting the alert in response to determining that the current collision prediction confirms the previous collision prediction.

Example 17

The method of examples 10-16 or any combination thereof, wherein determining whether to output the alert in response to comparing the current collision prediction to the previous collision prediction further includes determining that the current collision prediction indicates that a collision will occur, determining that the current collision prediction contradicts the previous collision prediction, and outputting the alert in response to determining that the current collision prediction contradicts the previous collision prediction.

Example 18

The method of examples 10-17 or any combination thereof, wherein determining whether to output the alert in response to comparing the current collision prediction to the previous collision prediction further includes determining that the current collision prediction indicates that a collision will occur, determining that the current collision prediction confirms the previous collision prediction, and outputting the alert in response to determining that the current collision prediction confirms the previous collision prediction.

Example 19

A system includes a radio receiver configured to receive a radio signal from a vehicle, wherein the radio signal includes audio data. In some examples, the system includes a non-transitory memory device configured to store a set of stored features and a set of stored maneuvers. In some examples, the system includes processing circuitry configured to apply a speech-recognition module to the audio data and determine one or more features of the audio data in response to applying the speech-recognition module to the audio data. The processing circuitry is further configured to compare the one or more features of the audio data to the set of stored features and select a stored feature from the set of stored features in response to comparing the one or more features of the audio data to the set of stored features. The processing circuitry is also configured to select an expected maneuver from the set of stored maneuvers, wherein the expected maneuver is associated with the selected stored feature. The processing circuitry is configured to calculate a current collision prediction based on the expected maneuver, compare the current collision prediction and a previous collision prediction, and determine whether to output an alert in response to comparing the current collision prediction and a previous collision prediction.

Example 20

The system of examples 18-19 or any combination thereof, wherein the processing circuitry is configured to determine whether to output the alert by at least determining that the current collision prediction indicates that no collision will occur, determining that the current collision prediction contradicts the previous collision prediction, and suppressing the alert from the previous collision prediction in response to determining that the current collision prediction contradicts the previous collision prediction.

The techniques of this disclosure may be implemented in a device or article of manufacture including a computer-readable storage medium. The term "processing circuitry," as used herein may refer to any of the foregoing structure or any other structure suitable for processing program code and/or data or otherwise implementing the techniques described herein. Elements of processing circuitry may be implemented in any of a variety of types of solid state circuit elements, such as CPUs, CPU cores, GPUs, digital signal processors (DSPs), application-specific integrated circuits (ASICs), a mixed-signal integrated circuits, field programmable gate arrays (FPGAs), microcontrollers, programmable logic controllers (PLCs), programmable logic device (PLDs), complex PLDs (CPLDs), a system on a chip (SoC), any subsection of any of the above, an interconnected or distributed combination of any of the above, or any other integrated or discrete logic circuitry, or any other type of component or one or more components capable of being configured in accordance with any of the examples disclosed herein.

System 110 may include one or more memory devices, such as memory device 140, that include any volatile or non-volatile media, such as a RAM, ROM, non-volatile RAM (NVRAM), electrically erasable programmable ROM (EEPROM), flash memory, and the like. The one or more memory devices may store computer-readable instructions that, when executed by processing circuitry, cause the processing circuitry to implement the techniques attributed herein to processing circuitry.

Elements of processing circuitry 130 and/or memory device 140 may be programmed with various forms of software. The processing circuitry and/or the transceiver may be implemented at least in part as, or include, one or more executable applications, application modules, libraries, classes, methods, objects, routines, subroutines, firmware, and/or embedded code, for example. Elements of processing circuitry 130 and/or memory device 140 as in any of the examples herein may be implemented as a device, a system, an apparatus, and may embody or implement a method of determining an estimated altitude of a melting layer.

The techniques of this disclosure may be implemented in a wide variety of computing devices. Any components, modules or units have been described to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

Various examples of the disclosure have been described. Any combination of the described systems, operations, or functions is contemplated. These and other examples are within the scope of the following claims.

What is claimed is:

1. A collision awareness system comprising:
 a receiver configured to receive audio data from a vehicle; and
 processing circuitry configured to:
  determine an expected maneuver for the vehicle based on the audio data;
  calculate a current collision prediction based on the expected maneuver;
  compare the current collision prediction to a previous collision prediction; and
  determine whether to output an alert in response to comparing the current collision prediction to the previous collision prediction.

2. The collision awareness system of claim 1, further comprising a non-transitory memory device configured to store a set of stored features, wherein the processing circuitry is configured to determine the expected maneuver by at least:
 applying a speech-recognition module to the audio data;
 determining one or more features of the audio data in response to applying the speech-recognition module to the audio data; and
 comparing the one or more features of the audio data to the set of stored features.

3. The collision awareness system of claim 2, wherein the processing circuitry is configured to determine the expected maneuver by at least selecting a stored feature from the set of stored features in response to comparing the one or more features of the audio data to the set of stored features.

4. The collision awareness system of claim 3,
 wherein the non-transitory memory device is further configured to store a set of stored maneuvers,
 wherein each stored feature from the set of stored features is associated with a respective recorded maneuver from the set of stored maneuvers, and
 wherein the processing circuitry is configured to determine the expected maneuver by at least determining the respective stored maneuver that is associated with the selected stored feature.

5. The collision awareness system of claim 1, wherein:
 the vehicle is another vehicle;
 the receiver includes a radio receiver configured to receive radio signals including the audio data from the other vehicle;
 the system is configured to be installed on an ownship vehicle; and
 the processing circuitry is configured to determine whether to output the alert by at least determining whether the other vehicle is likely to collide with the ownship vehicle while performing the expected maneuver.

6. The collision awareness system of claim 1, wherein:
 the vehicle is an ownship vehicle on which the system is installed;
 the receiver includes a microphone configured to receive the audio data from the ownship vehicle; and
 the processing circuitry is configured to determine whether to output the alert by at least determining whether the ownship vehicle is likely to collide with an object.

7. The collision awareness system of claim 1, wherein the processing circuitry is configured to determine whether to output the alert in response to comparing the current collision prediction to the previous collision prediction by at least:
 determining that the current collision prediction indicates that no collision will occur;
 determining that the current collision prediction contradicts the previous collision prediction; and
 suppressing the alert from the previous collision prediction in response to determining that the current collision prediction contradicts the previous collision prediction.

8. The collision awareness system of claim 1, wherein the receiver includes a radio receiver configured to receive radio signals including the audio data from the vehicle, the collision awareness system further comprising a surveillance receiver configured to receive surveillance broadcasts from the vehicle, wherein the processing circuitry is further configured to determine the previous collision prediction based on the surveillance broadcasts received by the surveillance receiver from the vehicle.

9. The collision awareness system of claim 1, wherein the processing circuitry is configured to determine the previous collision prediction based on surveillance signals received from the vehicle.

10. A collision awareness method executed by processing circuitry for:
 receiving audio data from a vehicle;
 determining an expected maneuver for the vehicle based on the audio data;
 calculate a current collision prediction based on the expected maneuver;
 compare the current collision prediction to a previous collision prediction; and
 determining whether to output an alert in response to comparing the current collision prediction to the previous collision prediction.

11. The collision awareness method of claim 10, wherein determining the expected maneuver comprises:
 applying a speech-recognition module to the audio data;
 determining one or more features of the audio data in response to applying the speech-recognition module to the audio data; and
 comparing the one or more features of the audio data to a set of stored features.

12. The collision awareness method of claim 11, wherein determining the expected maneuver comprises selecting a stored feature from the set of stored features in response to comparing the one or more features of the audio data to the set of stored features.

13. The collision awareness method of claim 12, wherein determining the expected maneuver further comprises determining a respective stored maneuver from a set of stored maneuvers that is associated with the selected stored feature, wherein each stored feature from the set of stored features is associated with a respective recorded maneuver from the set of stored maneuvers.

14. The collision awareness method of claim 10, wherein determining whether to output the alert in response to comparing the current collision prediction to the previous collision prediction further comprises:
   determining that the current collision prediction indicates that no collision will occur;
   determining that the current collision prediction contradicts the previous collision prediction; and
   suppressing the alert from the previous collision prediction in response to determining that the current collision prediction contradicts the previous collision prediction.

15. The collision awareness method of claim 10, wherein determining whether to output the alert in response to comparing the current collision prediction to the previous collision prediction further comprises:
   determining that the current collision prediction indicates that no collision will occur;
   determining that the current collision prediction confirms the previous collision prediction; and
   outputting the alert in response to determining that the current collision prediction confirms the previous collision prediction.

16. The collision awareness method of claim 10, wherein determining whether to output the alert in response to comparing the current collision prediction to the previous collision prediction further comprises:
   determining that the current collision prediction indicates that a collision will occur;
   determining that the current collision prediction contradicts the previous collision prediction; and
   outputting the alert in response to determining that the current collision prediction contradicts the previous collision prediction.

17. The collision awareness method of claim 10, wherein determining whether to output the alert in response to comparing the current collision prediction to the previous collision prediction further comprises:
   determining that the current collision prediction indicates that a collision will occur;
   determining that the current collision prediction confirms the previous collision prediction; and
   outputting the alert in response to determining that the current collision prediction confirms the previous collision prediction.

18. The collision awareness method of claim 10, further comprising determining the previous collision prediction based on surveillance signals received from the vehicle.

19. A collision awareness system comprising:
   a receiver configured to receive audio data from a vehicle;
   a non-transitory memory device configured to store a set of stored features; and
   processing circuitry configured to:
      apply a speech-recognition module to the audio data;
      determine one or more features of the audio data in response to applying the speech-recognition module to the audio data;
      determine an expected maneuver for the vehicle based on the audio data in least in part by comparing the one or more features of the audio data to the set of stored features; and
      determine whether to output an alert based on the expected maneuver determined from the audio data.

20. The collision awareness system of claim 19, wherein the processing circuitry is configured to determine the expected maneuver by at least selecting a stored feature from the set of stored features in response to comparing the one or more features of the audio data to the set of stored features.

* * * * *